(12) United States Patent
Blanchard et al.

(10) Patent No.: US 8,397,513 B2
(45) Date of Patent: Mar. 19, 2013

(54) DEVICE FOR TAPPING COOLING AIR IN A TURBOMACHINE

(75) Inventors: Stephane Pierre Guillaume Blanchard, Chartrettes (FR); Mathieu Dakowski, Sucy en Brie (FR); Thomas Daris, Paris (FR); Romain Nicolas Lunel, Montereau sur le Jard (FR)

(73) Assignee: SNECMA, Paris (FR)

( * ) Notice: Subject to any disclaimer, the term of this patent is extended or adjusted under 35 U.S.C. 154(b) by 818 days.

(21) Appl. No.: 12/603,943

(22) Filed: Oct. 22, 2009

(65) Prior Publication Data

US 2010/0104429 A1 Apr. 29, 2010

(30) Foreign Application Priority Data

Oct. 24, 2008 (FR) ..................................... 08 05929

(51) Int. Cl.
*F02K 1/00* (2006.01)

(52) U.S. Cl. .............. 60/770; 60/785; 60/231; 137/855; 251/148; 239/265.17; 239/265.39

(58) Field of Classification Search .................... 60/770, 60/231, 266, 782, 785; 251/158, 298, 299, 251/300, 301, 302, 303, 187, 203, 204, 228, 251/251, 257, 148; 239/127.1, 265.39, 265.17; 137/855
See application file for complete search history.

(56) References Cited

U.S. PATENT DOCUMENTS

| | | | | |
|---|---|---|---|---|
| 3,244,194 A * | 4/1966 | Henry | ............................ | 137/460 |
| 3,539,150 A * | 11/1970 | Conrad | .......................... | 251/228 |
| 3,672,630 A * | 6/1972 | Naumburg et al. | ........ | 251/149.2 |
| 3,875,921 A * | 4/1975 | Deboy et al. | ............. | 123/188.16 |
| 3,979,065 A * | 9/1976 | Madden | ...................... | 239/127.3 |
| 4,000,612 A * | 1/1977 | Wakeman et al. | .............. | 60/230 |
| 4,203,286 A * | 5/1980 | Warburton | ...................... | 60/266 |
| 5,255,849 A * | 10/1993 | Mayer et al. | ................ | 239/127.3 |
| 5,435,127 A * | 7/1995 | Luffy et al. | ..................... | 60/204 |
| 5,775,589 A * | 7/1998 | Vdoviak et al. | ............. | 239/127.1 |
| 5,996,936 A * | 12/1999 | Mueller | ...................... | 244/53 R |
| 6,021,637 A * | 2/2000 | Scavo | ............................. | 60/262 |
| 6,089,537 A * | 7/2000 | Olmsted | .................. | 251/129.11 |
| 6,301,877 B1 * | 10/2001 | Liang et al. | .................. | 60/226.1 |
| 6,409,149 B1 * | 6/2002 | Maher, Jr. | ..................... | 251/328 |
| 6,776,394 B2 * | 8/2004 | Lucas | ........................... | 251/259 |
| 7,032,835 B2 * | 4/2006 | Murphy et al. | ............... | 239/128 |

(Continued)

FOREIGN PATENT DOCUMENTS

DE 33 13 321 A1 10/1984
EP 0 374 004 A1 6/1990

(Continued)

*Primary Examiner* — William H Rodriguez
(74) *Attorney, Agent, or Firm* — Oblon, Spivak, McClelland, Maier & Neustadt, L.L.P.

(57) ABSTRACT

Device (10) for the tapping of air for the cooling of flaps of a turbojet nozzle, comprising an annular duct (18) having a radially internal wall (22) swept by a stream of air (24) and which comprises at least one air inlet orifice (20), a flap valve (40) for controlling the flow rate of air entering through the orifice (20), formed of an elastically deformable metal plate (42) of which a downstream end is fixed on an edge of the orifice (20), and of which an upstream end can be displaced by a manoeuvring member (46) mobile in translation parallel to the axis (52) of the orifice between a position where the plate (42) seals this orifice and a position where the plate (42) opens this orifice.

13 Claims, 2 Drawing Sheets

U.S. PATENT DOCUMENTS

| | | | |
|---|---|---|---|
| 7,204,472 B2 * | 4/2007 | Jones et al. | 251/129.06 |
| 7,213,393 B2 * | 5/2007 | Lapergue et al. | 60/266 |
| 7,296,397 B2 * | 11/2007 | Curtelin et al. | 60/232 |
| 7,762,526 B2 * | 7/2010 | Coleman et al. | 251/187 |
| 7,854,124 B2 * | 12/2010 | Sadil et al. | 60/771 |
| 8,141,366 B2 * | 3/2012 | Zamora et al. | 60/770 |
| 8,210,498 B2 * | 7/2012 | Blanchard et al. | 251/300 |
| 2005/0091964 A1 * | 5/2005 | Curtelin et al. | 60/262 |
| 2009/0320497 A1 | 12/2009 | Blanchard et al. | |
| 2009/0320498 A1 | 12/2009 | Blanchard et al. | |

FOREIGN PATENT DOCUMENTS

| | | |
|---|---|---|
| EP | 1 715 141 A2 | 10/2006 |
| GB | 2 046 363 A | 11/1980 |
| GB | 2 243 871 A | 11/1991 |
| GB | 2 243 876 A | 11/1991 |

* cited by examiner

DEVICE FOR TAPPING COOLING AIR IN A TURBOMACHINE

This invention relates to a device for tapping cooling air in a turbomachine, such as an aircraft turbojet, this device being intended in particular for the cooling of the flaps of a convergent divergent type jet nozzle.

The jet nozzle of a turbojet generally comprises mobile flaps which are subjected to strong heat stresses due to the passage of very hot gases coming from the combustion chamber of the turbomachine. These heat stresses generate high radiation in the infrared band which can harm the stealth of military aircraft and which it is desirable to limit as much as possible.

A solution consists in tapping cold air in a secondary stream of the turbomachine, in order to direct it towards the flaps of the nozzle and cool them.

Patent application EP 1 522 680 of the applicant describes a ventilation system for mobile flaps of a convergent divergent nozzle of an aircraft turbojet, this system comprising an annular duct fed with cooling air by orifices arranged in a wall separating the interior of the duct from the downstream end of an annular passage surrounding an afterburn chamber of the turbojet and wherein circulates a stream of cooling air. This ventilation system further comprises air distribution cells distributed around the duct and connected to the latter, and telescopic pipelines each connecting one cell to a divergent follower flap located in the same plane of symmetry as the cell.

The disadvantage with this system is that it does not make it possible to modulate the rate of air tapped for the cooling of the nozzle.

However, this tapping of air penalises the performance of the turbojet and in general is not required in all of the flight phases of the aircraft.

The invention has in particular for purpose to provide a simple, economic and effective solution to this problem, making it possible in particular to modulate at will the rate of tapped air for the cooling of the nozzle.

It in particular has for object means for feeding with cooling air in a turbomachine, located at a short distance upstream of the nozzle flaps, and which is able to support strong mechanical stresses generated by the pressure of the gases at this location, and major deformations of the nozzle due to strong heat stresses.

The invention also has for object means for feeding with cooling air which do not occupy much space and are relatively light, and which makes it possible to limit the disturbances of the streams of air flowing in the turbomachine, in order to optimise the performance of the latter.

It further has for object means for feeding with cooling air, which are controlled manually by the pilot of the aircraft.

The invention proposes to this effect a device for tapping air for the cooling of components in a turbomachine, comprising an annular duct formed in a casing and having a radially internal wall which is swept by a stream of air flowing from upstream to downstream and which comprises at least one radial axis air inlet orifice, the device comprising a flap valve for controlling the flow rate of air entering through the orifice, wherein said flap is formed of an elastically deformable metal plate of which a downstream end is fixed on an edge of the orifice, and of which an upstream end can be displaced by a manoeuvring member mobile in translation parallel to the axis of the orifice between a position wherein the plate is applied on the edge of the orifice and seals this orifice and a position wherein the upstream end of the plate is separated from the edge of the orifice and opens this orifice.

The plate forms, in the opening position of the orifice, a guiding wall of the stream of air towards the interior of the duct, in such a way as to facilitate the flow of this stream and as to limit the disturbances of it and the losses of load, which makes it possible to optimise the performances of the turbomachine.

In the closing position, the plate is maintained flush against the edge of the orifice and seals the latter sealingly under the effect of the pressure of the stream of air.

The upstream end of the elastically deformable plate is more preferably connected to the manoeuvring member by cooperation of forms, and advantageously comprises a finger or two parallel fingers engaged in a groove or a slot of the manoeuvring member.

This configuration makes it possible for the mobile end of the plate to follow a substantially circular path while being driven by the manoeuvring member which is displaced in rectilinear translation, due to the fact that the finger(s) of the plate can be more or less deeply engaged in the groove or in the slot of the manoeuvring member according to the separation of the plate.

According to another characteristic of the invention, the manoeuvring member comprises a ring with threaded internal cylindrical channel, cooperating with means formed in the casing for the guiding in translation and the locking in rotation of the ring, the ring comprising on its external surface means for connecting by cooperation of forms with the upstream end of the elastically deformable plate.

The locking in rotation of the ring can make it possible for the latter to be driven in translation by a screw-nut effect, as shall appear in what follows.

The means for locking the ring in rotation include more preferably at least one pin or a longitudinal rib engaged in a longitudinal groove formed on the external surface of the ring.

Alternatively, the ring has a polygonal external section and is housed in a cavity of the casing which extends along an axis parallel to the axis of the orifice and which has an internal section that is substantially identical to the external section of the ring for the locking in rotation of the ring.

According to another characteristic of the invention, the valve comprises a toothed wheel for driving in rotation a threaded rod screwed in the ring of the manoeuvring member and maintained fixed in translation by the casing.

The threaded rod cooperates with the internal threading of the ring for the driving of the ring in translation by a screw-nut effect. The means of locking in rotation of the ring mentioned hereinabove participate in this screw-nut effect, by preventing the rotation of the ring and by guiding the latter according to a solely translation movement.

The toothed wheel is driven in rotation by controlled means, comprising for example a flexible cable manoeuvred by a jack.

The valve advantageously comprises a releasable connecting ring which is mounted coaxially and placed on top of the toothed wheel and interlocked in rotation with the threaded rod, and which comprises teeth with slanted flanks intended to mesh with teeth of conjugated form formed at one end of the toothed wheel across from the teeth of the connecting ring, the valve further comprising more preferably means of elastic return stressing axially the teeth of the toothed wheel in mesh with those of the connecting ring.

During a closing of the flap, when the latter is abutted against the edge of the orifice, the connecting ring makes it possible to decouple the rotation of the toothed wheel from that of the threaded rod, and therefore from the translation of the manoeuvring member of the flap, in such a way that the toothed wheel can possibly continue its rotation without risk of damaging the flap.

According to another characteristic of the invention, the downstream end of the elastically deformable plate is fixed by screws or rivets on the edge of the orifice.

The air inlet orifice is advantageously plan, which makes possible the use of a plane plate for the flap, such a plate having in particular the advantage of being easier to deform than a curved plate in cylindrical portion.

According to another characteristic of the invention, the device for tapping air is installed on the casing of the turbomachine for the cooling of the controlled flaps of a jet nozzle, and it more preferably comprises a series of flap valves which are distributed in a uniform manner around the axis of the turbomachine and a control jack connected to the flap valves by a means for synchronous driving, such as for example a flexible cable or a ball-bearing cable, connected in series to the flap valves.

The flap valves of the device for tapping air described hereinabove make it possible to convert a simple movement of a means for driving these valves into an opening or closing movement of the flap of each of the valves, which allows for controlling the device via a simple and unique means of driving, which can in addition be advantageously chosen as flexible, such as a ball-bearing cable, in such a way that this device supports the deformations of the casing whereon it is mounted and the possible mechanical stresses generated by the pressure of the surrounding gases. The valves of the device for tapping air according to the invention are able to be used in conditions, in particular of temperature, which prohibit the use of electrically-controlled valves, as is for example the case in the vicinity of a turbojet jet nozzle. These valves have, furthermore, the advantage of taking up little space, and as such making it possible to limit the aerodynamic impact of the device for tapping air on the flow of gases in the vicinity of the device. These valves are in addition distributed evenly around the casing in such a way as to allow for an even tapping of air all around the casing.

The invention also relates to a turbomachine provided with a device for tapping air of the type described hereinabove.

The invention shall be better understood and other details, advantages and characteristics shall appear more clearly when reading the following description provided by way of a non-limiting example, in reference to the annexed drawings wherein.

Figure 1:
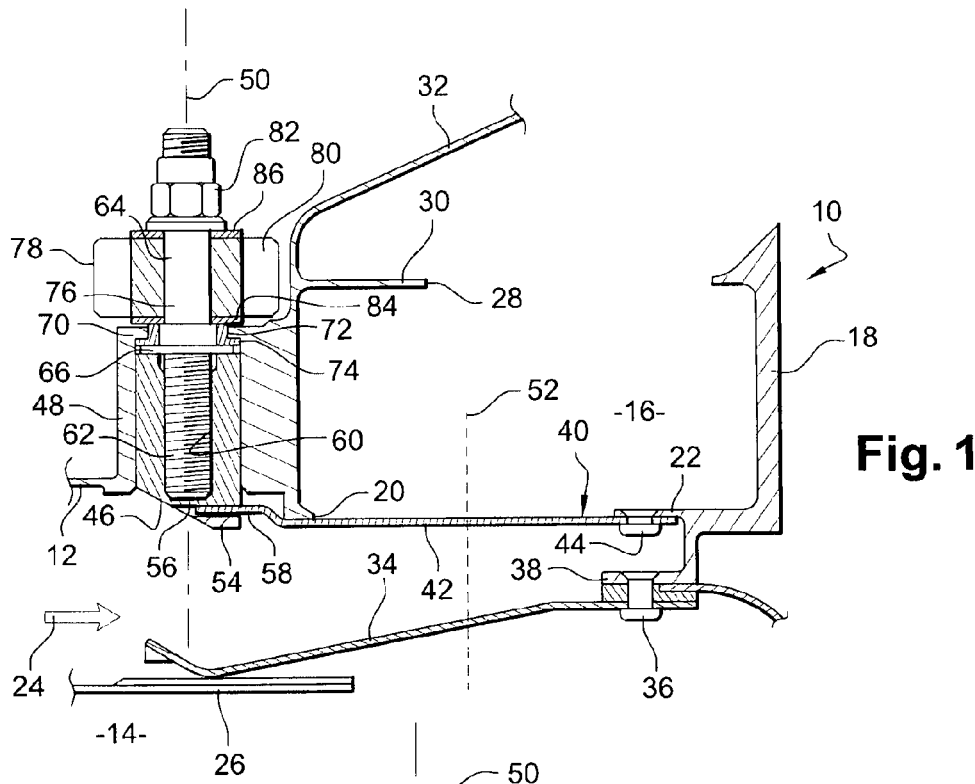
FIGS. 1 and 2 are partial schematic axial cross-section views of a device for tapping air according to a first embodiment of the invention, the device being mounted on a turbojet jet nozzle.

We shall first refer to FIG. 1 showing a device 10 for tapping cooling air mounted on the casing 12 of the afterbody of an aircraft bypass turbojet comprising an afterburn chamber 14, upstream of controlled flaps and follower flaps of a jet nozzle, analogously to the device described in EP 1 522 680 mentioned hereinabove.

The device 10 comprises an air circulation chamber 16 delimited by a duct 18 of a generally annular form and with a rectangular axial section, formed on the external surface of the casing. This duct 18 comprises the orifices 20 of radial axis formed in its radially internal wall 22 and intended for the tapping of cooling air on a secondary stream of cool air 24 flowing from upstream to downstream around an annular wall 26 delimiting the afterburn chamber, the duct 18 also comprising other orifices 28 formed in its radially external wall 30 and connected to means of carriage 32 and of distributing the air on the nozzle flaps to be cooled, these means 32 able to be for example of the type of those described in the aforementioned document of prior art.

An annular wall 34 extends between the downstream end of the external wall 26 of the afterburn chamber 14 and the radially internal wall 22 of the duct 18. This wall 34 is fixed by rivets 36 to an annular flange 38 formed at the downstream end of the radially internal wall 22 of the duct, and separates the secondary stream of cool air 24 into a radially outer stream intended to supply the tapping device 10 for the cooling of divergent flaps of the nozzle, and a radially inner stream intended for cooling convergent flaps of this nozzle, as already described in the aforementioned document of prior art.

According to the invention, the radially internal wall 22 of the annular duct 18 comprises plane parts wherein are formed the aforementioned air inlet orifices 20, in such a way that the latter are plane.

Figure 2:
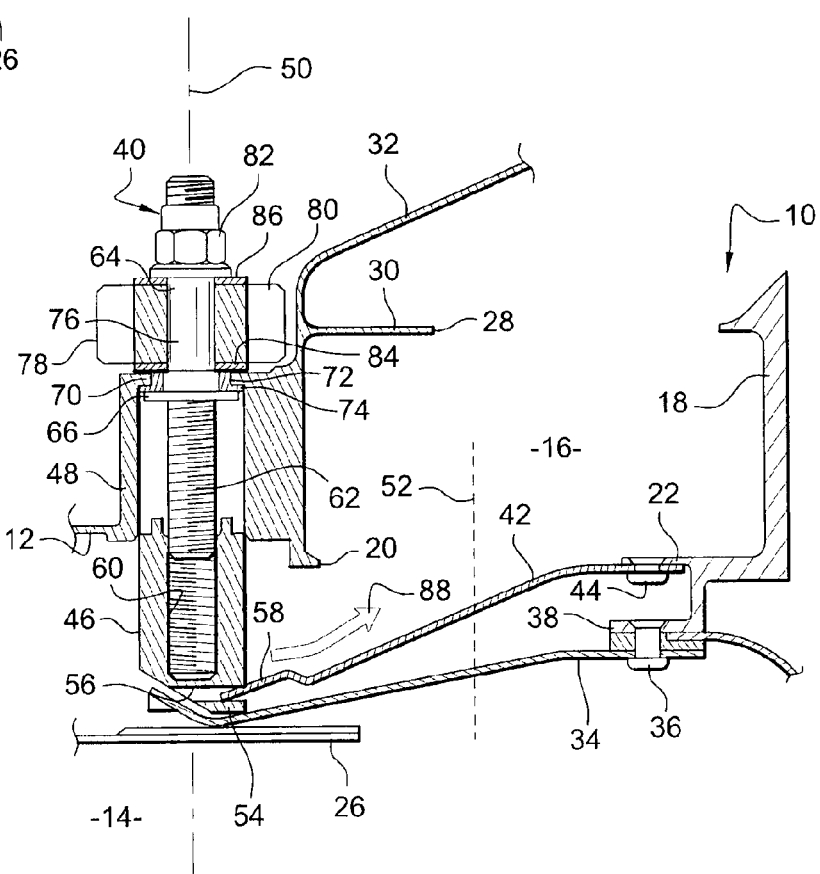

In order to allow for the control of the flow rate of tapped cooling air, each air inlet orifice 20 is sealed by a flap valve, such as the valve 40 that can be seen in FIGS. 1 and 2.

The flap of the valve 40 is formed of an elastically deformable plane metal plate 42 of which a downstream end is fixed on an edge of the orifice 20 by rivets 44, and of which the dimensions are greater than those of the orifice 20 in such a way that the plate 42 can entirely cover the orifice 20 in order to allow for the sealing of the latter, as shown in FIG. 1.

The valve 40 comprises a manoeuvring member 46 of the upstream end of the plate 42 for the opening and the sealing of the orifice 20. This manoeuvring member 46 is housed, centred and guided in a shaft with square internal section 48 with an axis 50 substantially parallel to the axis 52 of the orifice 20 and formed on the external surface of the casing 12, this member being mobile in translation according to the axis 50 of the shaft 48. The manoeuvring member 46 has the general form of a ring with square external section substantially conjugated with the internal section of the shaft 48 and of which one 54 of the axial ends is closed and comprises a slot or a groove 56 for receiving a finger 58 formed at the upstream end of the plate 42 and extending parallel to the plate, in order to allow the manoeuvring member 46 to separate or to bring together the upstream end of the plate 42 of the edge of the orifice 20 in order to modulate the flow rate of air passing by this orifice. At its other end, the manoeuvring member 46 comprises a threaded internal cylindrical channel 60 wherein is screwed the threaded end 62 of a rod 64 mounted in rotation in the shaft 48.

The rod 64 comprises a circular collet 66 intended to allow its locking in translation radially towards the exterior, parallel to the axis 50 of the shaft. For this, the shaft 48 comprises at its radially external end a shoulder 70 of its internal surface against which the collet 66 comes to abut.

In order to facilitate the guiding of the rod 64 in rotation, a sleeve 72 with cylindrical internal section is mounted around the rod 64 in such a way as to be interposed between the rod and the shoulder 70 of the end of the shaft. The sleeve 72 has a square external section conjugated with the internal section of the shoulder 70 of the end of the shaft, and comprises a collet 74 of square external section conjugated with the internal section of the shaft, this collet 74 being interposed between the collet 66 of the rod and the shoulder 70 of the end of the shaft.

The collet 66 of the rod 64 separates the latter into a first threaded portion 62 extending in the shaft 48 and screwed in the internal channel 60 of the manoeuvring member 46, and a second portion 76 extending outside of the shaft 48 and carrying a toothed wheel 78 for driving in rotation. The toothed wheel 78 carried radial teeth 80 intended to be in mesh with adequate means of driving, of which an example will be described in more detail in what follows, and it is maintained on the rod 64 by a nut 82 screwed at the end of the latter. The toothed wheel 78 includes splines (not shown in the figures) extending radially on its internal face and cooperating with splines (also not shown) of a substantially conjugated form formed on the second portion 76 of the rod 64 in order to transmit to this rod the rotation movement of the toothed wheel 78.

The toothed wheel 78 is applied axially on the shoulder 70 of the shaft 48 in such a way as to provide the locking of the rod 64 in translation radially towards the interior, parallel to the axis 50 of the shaft.

In order to minimise the wear and tear of the faces of the toothed wheel 78, the rod 64 carries advantageously two washers 84 and 86 arranged on either side of this toothed wheel 78.

The device according to the invention operates in the following way: the valve 40 being initially in its position of closing shown in FIG. 1, it is sufficient, to provoke the opening of the orifice 20 and the entry of cool air into the duct 18, to drive the toothed wheel 78 in rotation in the direction of unscrewing of the threaded portion 62 of the rod 64 outside of the internal channel 60 of the manoeuvring member 46, thanks to adequate means of driving.

In light of the locking in rotation of the manoeuvring member 46 and of the locking in translation of the rod 64, the rotation of the rod 64 in the direction of unscrewing of its threaded portion 62 results in a translation of the manoeuvring member 46 towards the interior of the turbojet. The manoeuvring member 46 drives with it the finger 58 of the upstream end of the plate 42 in such a way as to separate from the edge of the orifice 20 this end of the plate by inducing an elastic deformation of the latter, until the closed end 54 of the manoeuvring member comes to abut against the annular wall 34 of separating of the secondary stream, as shown in FIG. 2.

In the position of maximum opening of the valve shown in FIG. 2, the flow rate of tapped cooling air from the secondary stream, and shown by the arrow 88, is maximal.

In the opening position, the plate 42 of the flap forms a guiding wall of the tapped stream of air 88 towards the interior of the duct 18, and as such makes it possible to minimise the loss of load of this stream.

The sealing of the orifice 20 by the flap 42 is carried out by a driving in rotation of the toothed wheel 78 in the direction of screwing of the threaded portion of the rod in the internal channel 60 of the manoeuvring member 46, until the plate 42 of the flap is applied against the edge of the orifice 20.

In order to prevent the upstream end of the plate 42 from being subjected to too much mechanical stress at the time of the closing of the orifice, it is possible that the manoeuvring member 46 have an axial extension such as in the closing position of the flap, the open end of this member comes to abut against the collet 66 of the rod 64, as in FIG. 1.

Moreover, the external section of the manoeuvring member 46 and the internal section of the shaft 48 can be not square but rectangular, or more generally polygonal, in order to allow for a locking in rotation of the manoeuvring member 46.

Alternatively, the manoeuvring member 46 and the shaft 48 can be cylindrical, the locking in rotation of the manoeuvring member 46 being in this case provided by a cooperation of the rib/groove type between the manoeuvring member 46 and the shaft 48. For example, the internal surface of the shaft 48 can comprise a rib extending according to the axis 50 of the shaft and engaged in a groove of conjugated form formed on the external surface of the manoeuvring member 46 in order to prevent the rotation of the latter.

As has been described hereinabove, the plate 42 of the flap comprises at its upstream end a finger 58 engaged in a slot or a groove 56 of the manoeuvring member 46 in order to allow the manoeuvring member to separate or to bring together the upstream end of the plate 42 from the edge of the orifice 20. For greater solidity, the upstream end of the plate can comprise a second finger parallel to the first in order to form a fork. In any case, the slot or the groove 56 must have a dimension parallel to the axis 50 of displacement of the manoeuvring member 46, that is sufficient in order to allow for switching the radial finger(s) 58 into the opening position of the orifice 20, as shown in FIG. 2.

Figure 3:
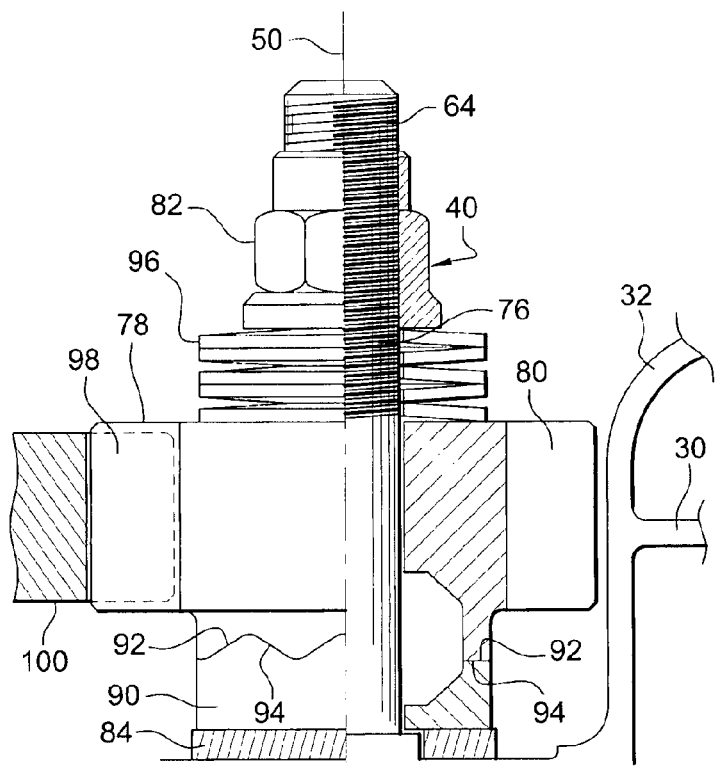
FIG. 3 is a partial schematic view on a larger scale of means for driving in rotation in a device for tapping air according to a second embodiment of the invention, the left portion of this figure being seen from the front while the right portion is a cross-section view according to median axial plane of the means for driving in rotation.

The valve 40 can furthermore include a releasable connecting ring 90 as shown in FIG. 3, this ring being coaxial and placed on top of the toothed wheel 78, and comprising teeth with slanted flanks 92 intended to mesh with teeth 94 of conjugated form formed at an end of the toothed wheel 78 across from teeth 92 of the connecting ring 90. In this case, it is not the toothed wheel 78 which is interlocked in rotation with the rod 64 thanks to splines, as in what has been described hereinabove, but it is the connecting ring 90 which comprises splines (not shown in FIG. 3) extending radially over its internal face and cooperating with splines (also not shown) of substantially conjugated form formed on the rod for the driving in rotation of the latter. Alternatively, the connecting ring 90 can be welded to the rod 64.

In order to allow for the operation of the releasable connecting ring 90, as shall be explained in more detail in what follows, elastically deformable washers 96, such as corrugated or tapered washers, for example in the number of three, are interposed between the toothed wheel 78 and its clamping nut 82 on the rod 64. FIG. 3 furthermore shows a tooth 98 of a member 100 for driving in rotation the toothed wheel 78, this tooth being intended to mesh with the teeth 80 of the toothed wheel.

In operation, during a manoeuvre of the flap 42 induced by the driving of the toothed wheel 78 in rotation, the releasable connecting ring 90 transmits the rotation movement of the toothed wheel 78 to the rod 64 of which the threaded end 62 is screwed in the internal channel 60 of the manoeuvring member 46.

When the flap 42 reaches its position of closing at the contact of the edge of the orifice 20 or when it reaches its position of maximum opening wherein the closed end 54 of the manoeuvring member 46 comes to abut against the annular wall 34 of separating of the secondary stream, the connecting ring 90 makes it possible to decouple the rotation of the toothed wheel 78 with that of the rod 64, in the case where the toothed wheel 78 continue to be driven in rotation. Indeed, when the manoeuvring member 46 is locked in translation, it prevents the rotation of the rod 64 and therefore of the connecting ring 90 which is interlocked in rotation with this rod 64. The force exerted by the means for driving in rotation of the toothed wheel 78 is then converted into axial force directed radially towards the exterior by the teeth with slanted flanks 92 and 94 of the toothed wheel and of the connecting ring, this force tending to separate the toothed wheel 78 of the connecting ring 90 by causing a compression of the elastically deformable washers 96.

The releasable connecting ring 90 makes it possible to minimise the risks of damaging the device for tapping air 10 in the case of driving of the toothed wheel 78 beyond the limits of travel of the flap 42 or of the manoeuvring member 46, and as such prevents having to have recourse to sophisticated means of controlling the means of driving 100 of the toothed wheel 78.

Figure 4:
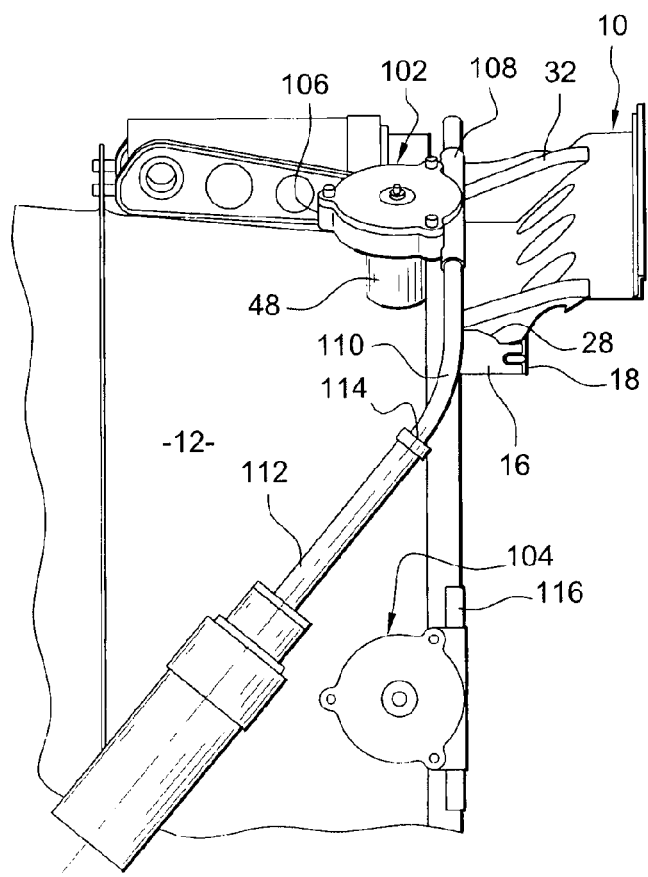
FIG. 4 is a partial schematic view in perspective of the jet nozzle provided with the device for tapping air in FIG. 1.

FIG. 4 shows a general view of the device 10 for the tapping of cooling air described hereinabove, and shows more particularly two valves 102 and 104 of this device and means for controlling these valves. The toothed wheel of each valve of the device is protected by a cylindrical fairing 106 comprising a rectilinear light 108 of passage of a member for driving, such as a flexible cable or a ball-bearing cable 110 for the driving of the toothed wheel. The cable 110 is actuated by a jack 112 mounted on the casing 12 of the nozzle and connected to one end 114 of the cable, the other end 116 of this cable 110 being free at the outlet from the last valve 104 controlled by this cable.

The device 10 for tapping air according to the invention offers the possibility of controlling all of the valves distributed around the nozzle in a synchronised manner by means of a single control jack, for the cooling of the controlled flaps of the jet nozzle of the turbojet, the controlling of this device able to be carried out manually by the pilot of the aircraft.

The use of a flexible cable 110 to transmit the control movement of the jack 112 to the toothed wheels 78 of the valves allows the system to support the deformations of the casing 12 whereon it is mounted while resisting the mechanical and heat stresses generated by the flow of gases in the surroundings of this system.

Furthermore, such a cable 110 does not require to be in a closed circuit, as its end opposite the control jack 112 can remain free as has already been mentioned, which makes possible an advantageous gain in weight.

The invention claimed is:

1. A device for tapping air for the cooling of components in a turbomachine, comprising an annular duct formed in a casing and having a radially internal wall which is swept by a stream of air flowing from upstream to downstream and which comprises at least one radial axis air inlet orifice, the device comprising a flap valve for controlling the flow rate of air entering through the orifice, wherein said flap is formed of an elastically deformable metal plate of which a downstream end is fixed on an edge of the orifice, and of which an upstream end can be displaced by a manoeuvring member mobile in translation parallel to the axis of the orifice between a position wherein the plate is applied on the edge of the orifice and seals this orifice and a position wherein the upstream end of the plate is separated from the edge of the orifice and opens this orifice, wherein the upstream end of the elastically deformable plate is connected to the manoeuvring member by cooperation of forms.

2. The device for tapping air according to claim 1, wherein the downstream end of the elastically deformable plate is fixed by screws or rivets on the edge of the orifice.

3. The device for tapping air according to claim 1, wherein the air inlet orifice is plane.

4. A turbomachine, wherein it comprises a device for tapping air according to claim 1.

5. A device for tapping air for the cooling of components in a turbomachine, comprising an annular duct formed in a casing and having a radially internal wall which is swept by a stream of air flowing from upstream to downstream and which comprises at least one radial axis air inlet orifice, the device comprising a flap valve for controlling the flow rate of air entering through the orifice, wherein said flap is formed of an elastically deformable metal plate of which a downstream end is fixed on an edge of the orifice, and of which an upstream end can be displaced by a manoeuvring member mobile in translation parallel to the axis of the orifice between a position wherein the plate is applied on the edge of the orifice and seals this orifice and a position wherein the upstream end of the plate is separated from the edge of the orifice and opens this orifice, wherein the upstream end of the elastically deformable plate comprises a finger or two parallel fingers engaged in a groove or a slot of the manoeuvring member.

6. A device for tapping air for the cooling of components in a turbomachine, comprising an annular duct formed in a casing and having a radially internal wall which is swept by a stream of air flowing from upstream to downstream and which comprises at least one radial axis air inlet orifice, the device comprising a flap valve for controlling the flow rate of air entering through the orifice, wherein said flap is formed of an elastically deformable metal plate of which a downstream end is fixed on an edge of the orifice, and of which an upstream end can be displaced by a manoeuvring member mobile in translation parallel to the axis of the orifice between a position wherein the plate is applied on the edge of the orifice and seals this orifice and a position wherein the upstream end of the plate is separated from the edge of the orifice and opens this orifice, wherein the manoeuvring member comprises a ring with threaded internal cylindrical channel, cooperating with means formed in the casing for the guiding in translation and the locking in rotation of the ring, the ring comprising on its external surface means for connecting by cooperation of forms with the upstream end of the elastically deformable plate.

7. The device for tapping air according to claim 6, wherein the means for the locking of the ring in rotation include at least one pin or one longitudinal rib engaged in a longitudinal groove formed on the external surface of the ring.

8. The device for tapping air according to claim 6, wherein the ring has a polygonal external section and is housed in a cavity of the casing which extends along an axis parallel to the axis of the orifice and which has an internal section that is substantially identical to the external section of the ring for the locking in rotation of the ring.

9. The device for tapping air according to claim 6, wherein the valve comprises a toothed wheel for driving in rotation a threaded rod screwed in the ring of the manoeuvring member and maintained fixed in translation by the casing.

10. The device for tapping air according to claim 9, wherein the valve comprises a releasable connecting ring which is mounted coaxially and placed on top of the toothed wheel and interlocked in rotation with the threaded rod, and which comprises teeth with slanted flanks intended to mesh with teeth of conjugated form formed at one end of the toothed wheel across from the teeth of the connecting ring.

11. The device for tapping air according to claim 10, wherein the valve comprises means of elastic return stressing axially the teeth of the toothed wheel in mesh with those of the connecting ring.

12. A device for tapping air for the cooling of components in a turbomachine, comprising an annular duct formed in a casing and having a radially internal wall which is swept by a stream of air flowing from upstream to downstream and which comprises at least one radial axis air inlet orifice, the device comprising a flap valve for controlling the flow rate of air entering through the orifice, wherein said flap is formed of an elastically deformable metal plate of which a downstream end is fixed on an edge of the orifice, and of which an upstream end can be displaced by a manoeuvring member mobile in translation parallel to the axis of the orifice between a position wherein the plate is applied on the edge of the orifice and seals this orifice and a position wherein the upstream end of the plate is separated from the edge of the orifice and opens this orifice, wherein the device is mounted on the aforementioned casing of the turbomachine, upstream of controlled flaps and of follower flaps of a jet nozzle, and wherein the device comprises a series of flap valves which are distributed in a uniform manner around the axis of the turbomachine.

13. A device for tapping air for the cooling of components in a turbomachine, comprising an annular duct formed in a casing and having a radially internal wall which is swept by a stream of air flowing from upstream to downstream and which comprises at least one radial axis air inlet orifice, the device comprising a flap valve for controlling the flow rate of air entering through the orifice, wherein said flap is formed of an elastically deformable metal plate of which a downstream end is fixed on an edge of the orifice, and of which an upstream end can be displaced by a manoeuvring member mobile in translation parallel to the axis of the orifice between a position wherein the plate is applied on the edge of the orifice and seals this orifice and a position wherein the upstream end of the plate is separated from the edge of the orifice and opens this orifice, wherein it is mounted on the aforementioned casing of the turbomachine, upstream of controlled flaps and of follower flaps of a jet nozzle, and wherein the device comprises a control jack connected to the flap valves by a means for synchronous driving, connected in series to the flap valves.

* * * * *